(12) United States Patent
Deck

(10) Patent No.: US 7,796,273 B2
(45) Date of Patent: Sep. 14, 2010

(54) PHASE-SHIFTING INTERFEROMETRY IN THE PRESENCE OF VIBRATION

(75) Inventor: Leslie L. Deck, Middletown, CT (US)

(73) Assignee: Zygo Corporation, Middlefield, CT (US)

(*) Notice: Subject to any disclaimer, the term of this patent is extended or adjusted under 35 U.S.C. 154(b) by 154 days.

(21) Appl. No.: 12/273,831

(22) Filed: Nov. 19, 2008

(65) Prior Publication Data

US 2010/0118313 A1 May 13, 2010

(51) Int. Cl.
*G01B 9/02* (2006.01)
*G01B 11/02* (2006.01)

(52) U.S. Cl. ................................ 356/511; 356/519
(58) Field of Classification Search ................ 356/480, 356/511, 512, 519
See application file for complete search history.

(56) References Cited

U.S. PATENT DOCUMENTS

| | | | |
|---|---|---|---|
| 4,594,003 A | 6/1986 | Sommargren | |
| 5,999,263 A | 12/1999 | Deck et al. | |
| 6,304,330 B1 | 10/2001 | Millerd et al. | |
| 6,359,692 B1 | 3/2002 | Groot | |
| 6,587,212 B1* | 7/2003 | Barber et al. | 356/502 |
| 6,717,680 B1* | 4/2004 | Kuchel et al. | 356/514 |
| 6,924,898 B2 | 8/2005 | Deck | |
| 6,995,848 B2* | 2/2006 | Deck | 356/512 |
| 2003/0160968 A1 | 8/2003 | Deck | |
| 2003/0164951 A1* | 9/2003 | Deck | 356/519 |
| 2004/0174526 A1 | 9/2004 | Tang | |
| 2005/0046864 A1 | 3/2005 | Millerd et al. | |
| 2008/0180679 A1* | 7/2008 | de Groot | 356/450 |
| 2008/0266571 A1 | 10/2008 | Deck | |
| 2010/0118312 A1* | 5/2010 | Deck | 356/450 |
| 2010/0118313 A1* | 5/2010 | Deck | 356/511 |

OTHER PUBLICATIONS

International Search Report for International Application No. PCT/US2009/063853 dated Jun. 18, 2010.

Xin Chen et al., "Phase-shifting interferometry with uncalibrated phase shifts", *Applied Optics*, vol. 39, No. 4, pp. 585-591 (Feb. 1, 2000).

(Continued)

*Primary Examiner*—Patrick J Connolly
(74) *Attorney, Agent, or Firm*—Fish & Richardson P.C.

(57) ABSTRACT

A phase-shifting interferometry (PSI) method and corresponding system including: (i) recording an interferogram for each phase in a sequence of phases between test light reflected from a test surface and reference light reflected from a reference surface, the test and reference light being derived from a common source, each interferogram corresponding to an intensity pattern produced by interfering the reflected test light with the reflected reference light, the interferograms defining an interferometry signal for each of different transverse locations of a cavity defined by the test and reference surfaces, each interferometry signal including a series of intensity values corresponding to the sequence of phases, with the difference between each pair of phases in the sequence defining a corresponding phase shift increment; (ii) calculating an initial phase map for the cavity based on at least some of the recorded interferograms; (iii) calculating an estimate for each of at least some of the phase shift increments based on the initial phase map and at least some of the recorded interferograms; and (iv) calculating an improved phase map based on the calculated estimates for the phase shift increments and at least some of the recorded interferograms.

30 Claims, 3 Drawing Sheets

OTHER PUBLICATIONS

C. T. Farrell et al., "Phase step measurement and variable step algorithms in phase-shifting interferometry", *Meas. Sci. Technol.*, vol. 3, pp. 953-958 (1992).

C. T. Farrell et al., "Phase-step insensitive algorithms for phase-shifting interferometry", *Meas. Sci. Technol.*, vol. 5, pp. 648-652 (1994).

Kenneth A. Goldberg et al., "Fourier-transform method of phase-shift determination", *Applied Optics*, vol. 40, No. 17, pp. 2886-2894 (Jun. 10, 2001).

J.E. Greivenkamp, "Generalized data reduction for heterodyne interferometry", *Optical Engineering*, vol. 23, No. 4, pp. 350-352 (Jul./Aug. 1984).

M. Kuchel, "The new Zeiss interferometer", *SPIE*, vol. 1332, pp. 655-663 (1990).

Daniel Malacara et al., "Spatial Linear and Circular Carrier Analysis", *Interferogram Analysis for Optical Testing*, Marcel Dekker, Inc., New York, pp. 285-335 (1998).

Katsuyuki Okada et al., "Simultaneous calculation of phase distribution and scanning phase shift in phase shifting interferometry", *Optics Communications*, vol. 84, No. 3, 4; pp. 118-124 (Jul. 15, 1991).

Mitsuo Takeda et al., "Fourier-transform method of fringe-pattern analysis for computer-based topography and interferometry", *J. Opt. Soc. Am.*, vol. 72, No. 1, pp. 156-160 (Jan. 1982).

R. Smythe et al., "Instantaneous phase measuring interferometry", *Proc. Soc. Opt. Eng.*, vol. 429, pp. 16-21 (1983).

Peter L. Wizinowich, "Phase shifting interferometry in the presence of vibration: A new algorithm and system", *Applied Optics*, vol. 29, No. 22, pp. 3271-3279 (Aug. 1, 1990).

\* cited by examiner

PHASE-SHIFTING INTERFEROMETRY IN THE PRESENCE OF VIBRATION

CROSS-REFERENCE TO RELATED APPLICATIONS

This application claims priority under 35 U.S.C. Section 119(e) to U.S. Provisional Application Ser. No. 61/113,759, filed Nov. 12, 2008 by Leslie L. Deck and entitled "PHASE-SHIFTING INTERFEROMETRY IN THE PRESENCE OF VIBRATION, the contents of which are incorporated herein by reference.

FIELD OF THE INVENTION

The invention relates to phase shifting interferometry methods as well as to related systems.

BACKGROUND

Interferometric optical techniques are widely used to measure surface topography, optical thickness, flatness, and other geometric and refractive index properties of precision optical components such as glass substrates used in lithographic photomasks.

For example, to measure the surface profile of a measurement surface, one can use an interferometer to combine a measurement wavefront reflected from the measurement surface with a reference wavefront reflected from a reference surface to form an optical interference pattern. Spatial variations in the intensity profile of the optical interference pattern correspond to phase differences between the combined measurement and reference wavefronts caused by variations in the profile of the measurement surface relative to the reference surface. Phase-shifting interferometry (PSI) can be used to accurately determine the phase differences and the corresponding profile of the measurement surface.

With PSI, the optical interference pattern is recorded for each of multiple phase-shifts between the reference and measurement wavefronts to produce a series of optical interference patterns that span at least a full cycle of optical interference (e.g., from constructive, to destructive, and back to constructive interference). The optical interference patterns define a series of intensity values for each spatial location of the pattern, wherein each series of intensity values has a sinusoidal dependence on the phase-shifts with a phase-offset equal to the phase difference between the combined measurement and reference wavefronts for that spatial location. Using numerical techniques known in the art, the phase-offset for each spatial location is extracted from the sinusoidal dependence of the intensity values to provide a profile of the measurement surface relative the reference surface. Such numerical techniques are generally referred to as phase-shifting algorithms.

The phase-shifts in PSI can be produced by changing the optical path length from the measurement surface to the interferometer relative to the optical path length from the reference surface to the interferometer. For example, the reference surface can be moved relative to the measurement surface. In addition to such mechanical phase-shifting, phase shifts can be introduced by electro-optic or acousto-optical modulation. Furthermore, the phase-shifts can be introduced for a constant, non-zero optical path difference by changing the wavelength of the measurement and reference wavefronts. The latter application is known as wavelength tuning PSI and is described, e.g., in U.S. Pat. No. 4,594,003 to G. E. Sommargren.

One example of a phase-shifting interferometer is a Fizeau interferometer illuminated with a coherent source, such as a laser. For example, a test surface of arbitrary shape is imaged with a Fizeau interferometer capable of producing a controlled phase shift along a Z axis for a PSI acquisition with the chosen algorithm. The optical system is aligned along the Z axis and the surface is imaged onto a camera so each pixel corresponds to a unique position in the XY plane. A laser beam is directed towards a reference surface and the test surface, and the interference between the light beams reflected from the test and reference surfaces are sampled as a function of phase shift and subsequently analyzed with a PSI algorithm to extract the test surface phase map, which is converted into physical units using the known wavelength of the laser beam. A conventional PSI algorithm assumes a constant scanning motion (i.e., constant velocity).

If the scanning motion is not uniform, errors in the measured surface profile occur. Unfortunately, it is often the case that the scanning motion in PSI is not uniform. This can occur due to nonlinear motions of the scanning mechanism, or through vibrations that act on each component of the interferometer differently.

SUMMARY

Disclosed herein are phase-shifting interferometry methods and systems for use in the presence of vibration.

The inventor has discovered that fitting methods for using phase-shifting interferometry (PSI) data to estimate deviations of actual phase shift increments from intended (systematic) phase shift increments because of vibrations can be significantly improved if at least a portion of the PSI data is obtained with less sensitivity to the vibrations and used to establish the sign of initial phase map used in the fitting. For example, the PSI data can be collected using an initial sequence of gradual mechanical phase shifts, followed by one or more rapid mechanical phase shifts. In the presence of large vibrations, one or more of the actual phase shift increments for the gradual sequence may be opposite in sign to that of the corresponding intended phase shift increments. Yet, the probability of this change in sign is not as likely for the rapid phase shift increments, except for very high frequency large vibrations. On the other hand, the rapid mechanical phase shifts are not desirable for the entire phase shift sequence because they produce additional vibration and noise. Accordingly, the data from the rapid phase shifts can be used to establish the correct sign for the phase map, while data from the more gradual phase shift sequence can used to refine the accuracy of the phase map after the sign is established. This is important because an incorrect sign for the phase map can result when vibration causes actual phase shift increments to be opposite in sign from intended phase shift increments, even for an otherwise optimized fitting. So, for example, a concave surface topography could incorrectly be calculated to be convex, and vice versa.

Furthermore, to address this problem, one way to collect PSI data to have a phase shift increment sign that is more robust in the presence of large vibration is to collect each of one or more pairs of consecutive interferograms during a phase shift increment that straddles adjacent frames of the camera, with each such interferograms having an integration time less than an inverse of the frame rate for the camera. Such an approach can be used for some, or even all, of the phase shift sequence.

Another technique disclosed herein for confirming the sign of the phase map (or equivalently, confirming the sign of the sequence of actual phase shift increments), is to use the fitting of PSI data to estimate the actual sequence of phase shift increments in the presence of vibration and then compare the result with the intended sequence of phase shift increments to determine whether or not the sign for the estimated sequence of phase shift increments should be maintained or flipped. For example, a correlation between the intended sequence of phase shift increments and each of positive and negative signs for the estimated sequence of phase shift increments can be calculated, with the higher correlation indicating the correct sign. An improved phase map with the correct sign can then be determined using the estimated sequence of actual phase shift increments with the correct sign. The comparison or correlation technique works because, while large vibrations can cause an actual phase shift increment to be very different (including being opposite in sign) from the intended phase shift, over the sequence of phase shifts, the vibrations will tend to decrease the intended phase shift as often as they tend to increase the intended phase shift, and so the sequence of actual phase shift increments remains correlated to the sequence of intended phase shift increments. In this sense, the sequence of intended phase shift increments imparts a "phase bias" to the sequence of actual phase shift increments. This correlation technique can be applied to conventionally acquired PSI data to determine the correct sign of the phase map, and it can also be applied to confirm the sign obtained when PSI data is specifically acquired to be robust to changes in sign caused by vibrations.

More generally, we now summarize different aspects and features of the methods and systems disclosed herein.

In general, in one aspect, disclosed herein is a phase-shifting interferometry (PSI) method including: (i) recording an interferogram for each phase in a sequence of phases between test light reflected from a test surface and reference light reflected from a reference surface, the test and reference light being derived from a common source, each interferogram corresponding to an intensity pattern produced by interfering the reflected test light with the reflected reference light, the interferograms defining an interferometry signal for each of different transverse locations of a cavity defined by the test and reference surfaces, each interferometry signal including a series of intensity values corresponding to the sequence of phases, with the difference between each pair of phases in the sequence defining a corresponding phase shift increment; (ii) calculating an initial phase map for the cavity based on at least some of the recorded interferograms; (iii) calculating an estimate for each of at least some of the phase shift increments based on the initial phase map and at least some of the recorded interferograms; and (iv) calculating an improved phase map based on the calculated estimates for the phase shift increments and at least some of the recorded interferograms. For example, the improved phase map can be indicative of a surface topography for the test surface.

In one set of embodiments, the PSI method is for use in the presence of vibrations, and each phase shift increment includes a systematic component and a random component caused by the vibrations. The random component produces a probability that a phase shift increment will change sign relative to the sign for the systematic component. The interferograms are recorded to produce at least two distinct sets of interferograms, the distinct sets including a first set including at least one pair of interferograms and a second set including at least one interferogram, with the probability of the sign change in the phase shift increment for the pair of interferograms in the first set being less than that for any pair of interferograms including at least one interferogram from the second set. The initial phase map for the cavity is calculated based on at least the pair of interferograms in the first set of interferograms.

Such embodiments can further include any of the following features.

The recorded interferograms used to calculate the phase shift increments can include at least one interferogram from the second set.

Calculating the initial phase map can include determining at least the sign for the initial phase map based on at least some of the interferograms in the first set of interferograms and not any interferograms in the second set. For example, calculating the initial phase map can include calculating a preliminary phase map for each of different pairs of interferograms in the first set and averaging the preliminary phase maps. For example, the absolute magnitudes of the systematic components of the phase shift increments for the different pairs of interferograms used to calculate the preliminary phase maps can be substantially equal to pi/2 radians (modulo pi). Furthermore, in another example, calculating the initial phase map can further include identifying one or more pairs of recorded interferograms substantially in-quadrature with one another based on one or more of the recorded interferometry signals and determining an absolute magnitude for the initial phase map based on the identified in-quadrature interferogram pairs. The in-quadrature interferograms used to get the absolute magnitude for the initial phase map can be from the first set, the second set, or a combination of both.

Each interferogram in the first set can be recorded with an integration time smaller than those for the interferograms in the second set.

An electronic detector used to record the interferograms can define a frame rate, and each interferogram in the first set can be recorded with an integration time less than an inverse of the frame rate. Furthermore, for example, the recorded interferograms in the first set can include at least one pair of consecutive interferograms obtained during a phase shift increment that straddles adjacent frames of the electronic detector.

The systematic component of each phase shift increment for consecutive phases can define an absolute magnitude for the phase shift increment, a time period for imparting the magnitude, and a phase slope equal to the absolute magnitude divided by the time period, and wherein the interferograms can be recorded to cause the phase slope for each of the phase shift increments corresponding to the interferograms in the first set to be larger than any of the phase slopes corresponding to phase shift increments involving interferograms in the second set. For example, the absolute magnitudes for the systematic components of the phase shift increments can be substantially equal. In certain applications, it is preferable for the interferograms in the first set to be recorded at the end of the sequence of phases.

Calculating the phase shift increment estimates can include determining a sign for the estimates based on information about the systematic components for at least some of the phase shift increments. For example, determining the sign for the estimates can include correlating the information about the systematic components with each of positive and negative signs for the set of phase shift increment estimates.

In another set of embodiments, an electronic detector used to record the interferograms defines a frame rate, and the recorded interferograms include a first set including at least one pair interferograms each recorded with an integration time less than an inverse of the frame rate, and wherein the initial phase map for the cavity is calculated based on at least the pair of interferograms in the first set of interferograms.

Furthermore, for example, the recorded interferograms in the first set can include at least one pair of consecutive interferograms obtained during a phase shift increment that straddles adjacent frames of the electronic detector.

Such embodiments can further include any of the following features.

Calculating the initial phase map can include determining at least the sign for the initial phase map based on at least the pair of interferograms in the first set of interferograms. For example, calculating the initial phase map can include calculating a preliminary phase map for each of different pairs of interferograms in the first set and averaging the preliminary phase maps. For example, the absolute magnitudes of the systematic components of the phase shift increments for the different pairs of interferograms used to calculate the preliminary phase maps can be substantially equal to pi/2 radians (modulo pi). Furthermore, in another example, calculating the initial phase map can further include identifying one or more pairs of recorded interferograms substantially in-quadrature with one another based on one or more of the recorded interferometry signals and determining an absolute magnitude for the initial phase map based on the identified in-quadrature interferogram pairs. The in-quadrature interferograms used to get the absolute magnitude for the initial phase map can be from the first set, or a second set (if any), or a combination of both.

Calculating the phase shift increment estimates can include determining a sign for the estimates based on information about the systematic components for at least some of the phase shift increments. For example, determining the sign for the estimates can include correlating the information about the systematic components with each of positive and negative signs for the set of phase shift increment estimates.

In yet another set of embodiment, each phase shift increment includes a systematic component and a random component caused by vibrations, and calculating the phase shift increment estimates includes determining a sign for the estimates based on information about the systematic components for at least some of the phase shift increments. For example, determining the sign for the estimates can include correlating the information about the systematic components with each of positive and negative signs for the set of phase shift increment estimates.

Such embodiments can include any of the following features.

Calculating the initial phase map can include identifying one or more pairs of recorded interferograms substantially in-quadrature with one another based on one or more of the recorded interferometry signals. For example, multiple in-quadrature pairs can be identified, and calculating the initial phase map can further include calculating a preliminary phase map for each in-quadrature pair, setting a sign for all of the preliminary phase maps to be the same, and thereafter averaging the preliminary phase maps to provide the initial phase map.

Finally, the embodiments in any of the above three sets of embodiments can include any of the following features.

Calculating the phase shift increment estimates can include fitting the interferometry signals for the different locations of the cavity to a set of theoretical interferometry signals for a theoretical cavity corresponding to the initial phase map and parameterized by the estimates for the phase shift increments. For example, the parameterized estimates for the phase shift increments include a set of phase shift increments common to the different locations. Furthermore, for example, the fitting includes a least squares optimization to calculate the phase shift increment estimates. Moreover, the fitting can further account for changes in one or more (e.g., two or more) of the piston, tip, and tilt of the test surface during the sequence of phases.

The common source can be a laser.

The sequence of phases can be produced by phase-shifting over a range smaller than a coherence length of the common source.

The sequence of phases can be produced by mechanical phase shifting, wavelength tuning, electro-optic phase modulation, or acousto-optical modulation. For example, the sequence of phases can be produced by varying an optical path length difference between the test light and the reference light. Alternatively, the sequence of phases can be produced by varying a wavelength for the common source for a non-zero optical path difference between the test light and the reference light from the common source to the detector.

The method can further include determining a surface topography for the test surface based on the improved phase map.

The fitting can include fitting the interferometry signals $I_j$ for the different transverse locations x according to the following expression to determine the phase shift increment estimates:

$$\frac{I_j(x) - A(x)}{B(x)} = \cos(\overline{\theta}(x) + \Delta_j) = C_j \cos(\overline{\theta}(x)) + S_j \sin(\overline{\theta}(x)),$$

wherein $\Delta_j$ defines the sequence of phases, indexed by j, wherein the expression $\cos(\overline{\theta}(x)+\Delta_j)$ corresponds to the theoretical interferometry signals for the initial phase map $\overline{\theta}(x)$, wherein $A(x)$ and $B(x)$ are AC and DC components for the recorded interferometry signals, wherein where $C_j=\cos(\Delta_j)$ and $S_j=-\sin(\Delta_j)$, and wherein the phase shift increment estimates $\Delta'$ are determined from the sequence of phases according to $\Delta_j'=\text{Mod}_{2\pi}(\Delta_j-\Delta_{j-1})$.

For example, AC and DC components for the recorded interferometry signals can be determined according to the expression:

$$A(x) = \frac{\max(I(x)) + \min(I(x))}{2}, B(x) = \frac{\max(I(x)) - \min(I(x))}{2}.$$

The fitting can further include a subsequent fitting to account for changes in piston, tip, and tilt of the test surface during the sequence of phases, wherein the recorded interferometry signals $I_j$ and the determined phase shift increment estimates $\Delta_j$ for the initial fitting are fit to the following expression:

$$\frac{I_j(x) - A(x)}{B(x)} = \cos(\overline{\theta}(x) + \Delta_j + \delta_j + \alpha_j x + \beta_j y),$$

wherein $\delta_j$, $\alpha_j$, and $\beta_j$ correspond to phase shift increment coefficients for piston, tip and tilt, respectively. For example, the expression for the subsequent fitting can be linearized to yield:

$$\frac{I_j(x) - A(x)}{B(x)} = \cos(\overline{\theta}(x) + \Delta_j) - \sin(\overline{\theta}(x) + \Delta_j)(\delta_j + \alpha_j x + \beta_j y).$$

Calculating the improved phase map based on the calculated phase shift increments can includes: (i) calculating an intermediate phase map based on the calculated estimates for the phase shift increments and at least some of the recorded interferograms; (ii) calculating an improved estimate for each of the phase shift increments based on the intermediate phase map and at least some of the recorded interferograms; and (iii) calculating the improved phase map based on the improved estimate for phase shift increments and at least some of the recorded interferograms.

Calculating the improved phase map based on the calculated estimates for the phase shift increments can include fitting the recorded interferometry signal at each of the different transverse locations to a sinusoidal function of the calculated estimates for the phase shift increments to determine a cavity phase at each location. For example, the sinusoidal function can account for one or more harmonics of the recorded interferometry signals to model multiple reflections in the cavity.

The method can further include storing or outputting information about the improved phase map.

In general, in another aspect, disclosed herein is a phase-shifting interferometry (PSI) system including: a phase-shifting interferometry (PSI) apparatus and an electronic processor. The PSI apparatus including a light source, a phase-shifting interferometer, and an electronic detector. The PSI apparatus configured to record an interferogram for each phase in a sequence of phases between test light reflected from a test surface and reference light reflected from a reference surface of the phase-shifting interferometer, the test and reference light be derived from a common source corresponding to the light source. Each interferogram corresponds to an intensity pattern produced by interfering the reflected test light with the reflected reference light, the interferograms defining an interferometry signal for each of different transverse locations of a cavity defined by the test and reference surfaces, each interferometry signal comprising a series of intensity values corresponding to the sequence of phases, with the difference between each pair of phases in the sequence defining a corresponding phase shift increment. The electronic processor is coupled to the phase-shifting apparatus, and the electronic processor is configured to: (i) calculate an initial phase map for the cavity based on at least some of the interferograms; (ii) calculate an estimate for each of at least some of the phase shift increments based on the initial phase map and at least some of the recorded interferograms; and (iii) calculate an improved phase map based on the calculated estimates for the phase shift increments and at least some of the recorded interferograms.

In a first set of embodiments for the system, each phase shift increment includes a systematic component imparted by the phase-shifting interferometer and a random component caused by vibrations. The random component produces a probability that a phase shift increment will change sign relative to the sign for the systematic component. For this first set of embodiments, the phase-shifting apparatus is configured to record the interferograms to produce at least two distinct sets of interferograms, the distinct sets including a first set including at least one pair of interferograms and a second set including at least one interferogram, wherein the probability of the sign change in the phase shift increment for the pair of interferograms in the first set is less than that for any pair of interferograms comprising at least one interferogram from the second set. Furthermore, the electronic processor is configured to calculate the initial phase map for the cavity based on at least the pair of the interferograms in the first set of interferograms.

Embodiments for the first set of embodiments for the system can further include any of the features described above for the corresponding first-mentioned set of method embodiments.

In a second set of embodiments for the system, the electronic detector used to record the interferograms defines a frame rate, and the PSI apparatus is configured to record the interferograms to include a first set including at least one pair interferograms each recorded with an integration time less than an inverse of the frame rate, and wherein the initial phase map for the cavity is calculated based on at least the pair of interferograms in the first set of interferograms. Furthermore, for example, the PSI apparatus can be configured to cause the recorded interferograms in the first set to include at least one pair of consecutive interferograms obtained during a phase shift increment that straddles adjacent frames of the electronic detector.

Embodiments for the second set of embodiments for the system can further include any of the features described above for the corresponding second-mentioned set of method embodiments.

In a third set of embodiments for the system, each phase shift increment includes a systematic component imparted by the phase-shifting interferometer and a random component caused by vibrations, and the calculation of the phase shift increment estimates by the electronic processor includes determining a sign for the estimates based on information about the systematic components for at least some of the phase shift increments. For example, the electronic processor can be configured to determine the sign for the estimates by configuring it to correlate the information about the systematic components with each of positive and negative signs for the set of phase shift increment estimates.

Embodiments for the third set of embodiments for the system can further include any of the features described above for the corresponding third-mentioned set of method embodiments.

As used herein, "light" is not limited to electromagnetic radiation in the visible spectral region, but rather refers generally to electromagnetic radiation in any of the ultraviolet, visible, near infrared, and infrared spectral regions.

As used herein, the "integration time" is the time period over which the interference intensity pattern is being recorded by the electronic detector for a given one of the phases or range of phases in the sequence of phases.

As used herein, the "frame rate" for the electronic detector is the inverse of the shortest time period for reading out all elements of the electronic detector.

Unless otherwise defined, all technical and scientific terms used herein have the same meaning as commonly understood by one of ordinary skill in the art to which this invention belongs. In case of conflict with any document incorporated by reference, the present disclosure controls.

Other features, objects, and advantages of the invention will be apparent from the following detailed description.

BRIEF DESCRIPTION OF THE DRAWINGS

Like reference numerals in different drawings refer to common elements.

DETAILED DESCRIPTION

The term "comprising" and variations thereof as used herein are used synonymously with the term "including" and variations thereof and are open, non-limiting terms.

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Phase Shifting Interferometers

Figure 1:
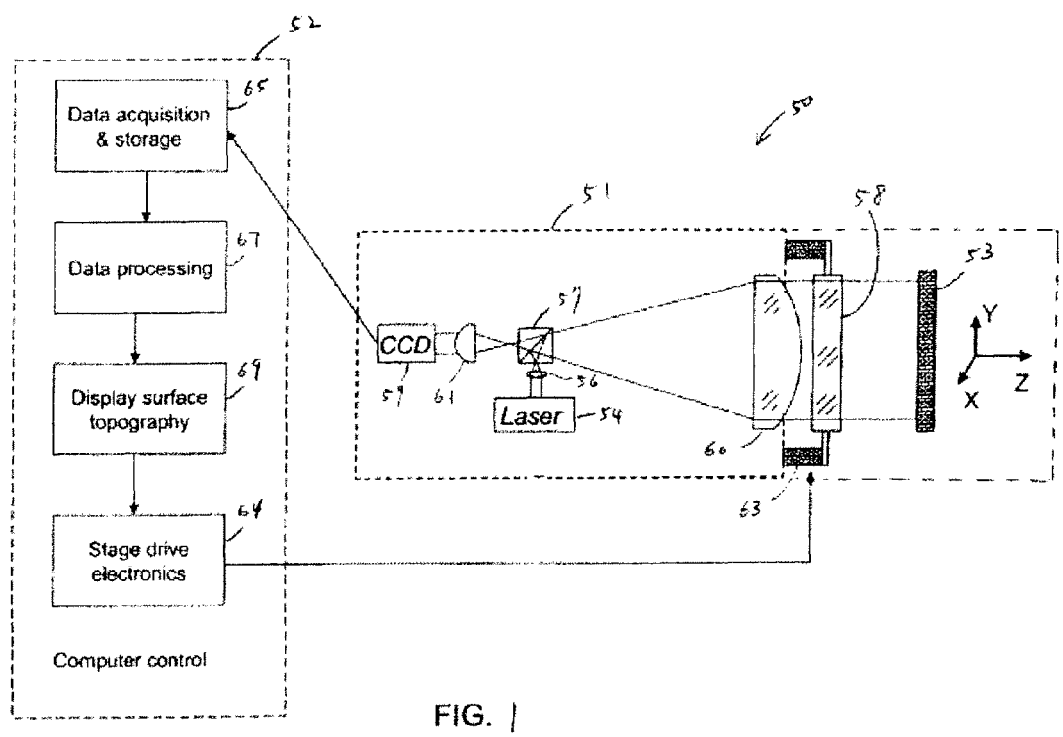
FIG. 1 is a schematic diagram of a phase-shifting interferometry system.

The present disclosure relates to phase shifting interferometers. FIG. 1 shows one example of a phase-shifting interferometry system 50 for obtaining interference signals includes an interferometer 51 and a processor 52 (e.g., an automated computer control system). The measurement system 50 is operable to obtain phase-shifting interferometry data of spatial locations of a surface of a test object 53.

System 50 includes a light source 54, a first focusing optic (e.g., one or more lenses) 56, a beam splitting element 57, a second focusing optic 60, a reference object 58, a third focusing optic 61, and a detector 59. Light source 54 emits spectrally-narrowband light with high coherence (e.g., a laser). First focusing optic 56 focuses light from the light source 54 onto beam-splitting element 57, which redirects the light towards second focusing optic 60, which collimates the light and transmits collimated light to reference object 58.

The reference object 58 can be, e.g., a piece of glass that partially reflects the collimated light and partially transmits the collimated light. The light that passes through the reference object 58 is transmitted towards the test object 53. Light reflected from the test object 53 and light reflected from the reference object 58 is received by second focusing optic 60, which transmits the combined reflected light back to beam-splitting element 57. Beam-splitting element 57 transmits the combined light to third focusing optic 61, which focuses the combined light to a detector 59. The partially reflective surface of reference object 58 defines a reference surface and the reflective surface of the test object 58 defines a test surface. The reference surface and test surface of the interferometer define an optical cavity.

Detector 59 is typically a multidimensional detector (e.g., a charge coupled device (CCD) or charge injection device (CID)) having a plurality of detector elements (e.g., pixels) arranged in one or more dimensions (e.g., two dimensions). The detector is also referred to herein as a "camera." Optics 60 and 61 focus light reflected from test object 53 onto detector 59 so that each detector element of detector 59 receives light reflected from a corresponding spatial location (e.g., a point or other small region) of test object 53. Light reflected from respective spatial locations of test object 53 and light reflected from reference object 58 interferes at detector 59 to form an interference pattern or "interferogram." Each detector element produces a detector signal related to the intensity of the interferogram at that detector element, which in turn corresponds to a particular transverse location on the test and reference surfaces.

System 50 is configured to measure interference signals related to spatial locations of test object 53. Typically, system 50 creates a series of phase shift increments between light reflected from reference object 58 and light reflected from test object 53. For example, reference object 58 can be displaced through a number of scan positions along a scan dimension axis (Z axis in the example of FIG. 1) by a scan mechanism (e.g., an electro-mechanical transducer 63 (e.g., a piezoelectric transducer (PZT)), and associated drive electronics 64) controlled by computer 52. As result, phase shifts increments are produced because the scan mechanism changes the optical path difference (OPD) between the light reflected from the test object and the light reflected from the reference surface. In some embodiments, a scan position increment between successive scan positions is at least about $\lambda/15$ (e.g., at least about $\lambda/8$, at least about $\lambda/4$), where $\lambda$ is a mean wavelength of the light detected at each pixel.

For each phase shift, detector 59 outputs an intensity value (e.g., the intensity detected by a given detector element) for each of multiple different spatial locations of the test object. Taken along the scan dimension, the intensity values for each spatial location define an interference signal corresponding to the spatial location. The intensity values corresponding to a common position define a data set (i.e., an interferogram) for that phase shift. In certain embodiments, the data sets for the series of phase shift increments can be analyzed with a PSI algorithm to extract the phase map for the cavity, which can be expressed in physical units using the known wavelength of the light source 54. The phase map is indicative of the surface topology of the test surface relative to the reference surface. In further embodiments described below, additional techniques are disclosed for determining and/or improving the test surface phase map.

FIG. 1 is but one example of a phase-shifting interferometer. Although phase-shifting system 100 in FIG. 1 included a Fizeau interferometer, other embodiments can employ an interferometer of a different type such as Twyman Green, Mach Zehnder, Michelson, Fabry-Perot, and grazing-incidence or unbalanced Mirau. Also, the interferometer can be a large aperture, microscope, or fiber optic sensor interferometer.

Furthermore, other techniques can be used to perform the phase shifting. While the embodiment of FIG. 1 used a mechanical phase shifter to vary the OPD, in other embodiments, for example, electro-optic phase modulation can be used. Furthermore, rather than varying OPD, wavelength-tuning can be used. For example, light source 54 in FIG. 1 can be a tunable source (e.g., a tunable laser diode), and the series of phase shift increments can be introduced by scanning the wavelength of the source so that the phase shift corresponding to the non-zero OPD between the test and reference paths varies. Commonly owned U.S. Pat. Nos. 4,594,003 and 6,359,692, the contents of which are incorporated herein by reference, describe additional details of wavelength-tuning phase-shifting interferometers. Furthermore, in commonly-owned U.S. Pat. No. 6,924,898, the contents of which are incorporated herein by reference, a phase-shifting interferometer is disclosed (see, for example, FIG. 7) whereby phase shifts are introduced by modulating the propagation wavevector of the light being directed to the test surface. Such modulation can be achieved, for example, by acousto-optical modulation.

PSI Data in the Presence of Large Vibration

Consider a PSI data acquisition with a number M phase shifted single frame interferograms. Vibrations mean that the phase shifts between the M frames include a random component, so a-priori no particular phase relationships can be assumed. However, it is assumed that the frame integration time is short relative to the vibrations present so that contrast loss is negligible. M is preferably large, at least compared to conventional PSI acquisitions, so that one can assure a broad sampling of temporal phases (large temporal phase diversity). Even though M is larger than conventional PSI in the absence of vibration, it still represents only a small amount of time and so is not a great imposition with current camera technology. Assuming two-beam interference, the cavity intensity goes as:

$$I(x,t) = A(x) + B(x)\cos(\theta(x) + \phi(t)) \quad (1)$$

where $\theta(x)$ is the cavity phase (or "phase map"), x represents a two component vector denoting a field position (corresponding to a transverse location on each of the test and reference surfaces), $\phi(t)$ is the time dependent phase shift and $A(x)$ and $B(x)$ are DC and AC terms respectively. The AC and DC terms can be estimated simply via;

$$A(x) = \frac{\max(I(x)) + \min(I(x))}{2}, \; B(x) = \frac{\max(I(x)) - \min(I(x))}{2} \quad (2)$$

where the full set of M interferograms is used in the maximum ("max") and minimum ("min") calculations. These estimates will be best for a large number of frames and essentially drive the minimum value for M. The DC and AC terms can also be estimated by fitting sinusoid to Equation 1 for each field position.

In the absence of vibration, the phase shift sequence $\phi(t)$ is known, and the cavity phase $\theta(x)$ can be determined at each field position to yield, for example, the surface topography of the test surface with respect to the reference surface. Even in the presence of vibration, however, where the phase shift sequence $\phi(t)$ becomes unknown, iterative fitting techniques can be used to estimate the cavity phase.

For example, the intended sequence of phase shifts can be used to get an initial estimate for the cavity phase, and then an estimate for the actual sequence of phase shifts can be calculated by fitting the PSI data I(x,t) to Equation 1 based on the initial cavity phase and under the assumption that the actual phase shift sequence is the same for all field positions. (As explained in further detail below, this assumption can be relaxed to account for small frequency frequencies, such as tip, tilt, and piston). An improved estimate for the cavity phase can then be determined from the calculated phase shifts and the PSI data for each field position, with further iterations as necessary.

However, in the presence large vibrations, this iterative approach can break down absent careful attention to the overall sign of the cavity phase, or equivalently, the overall sign of the phase shift sequence. This can be understood from the argument of the cosine term in Eq. 1. For example, if vibrations cause the actual phase shift increment $\phi_{12}$ between a first interferogram $I(x,t_1)$ at time $t=t_1$ and a second interferogram $I(x,t_2)$ at $t=t_2$ to have a sign opposite to that of the intended phase shift increment, fitting techniques applied to the pair of interferograms will yield a cavity phase with the incorrect sign. So, for example, a concave surface topology for the test surface would be reported as convex, and vice-versa. Notably, this is true even for an otherwise optimal fit.

Moreover, while many PSI algorithms and fitting routines are robust for certain deviations of an actual phase shift increment from an intended phase shift, the inventor has recognized such robustness completely breaks down for vibrations large enough to change the sign of the actual phase shift increment. (As used herein, the "sign" of a phase shift increment is understood to be the sign of the phase, when that phase, modulo $2\pi$, is expressed in radians from $-\pi$ to $+\pi$.)

Figure 2:
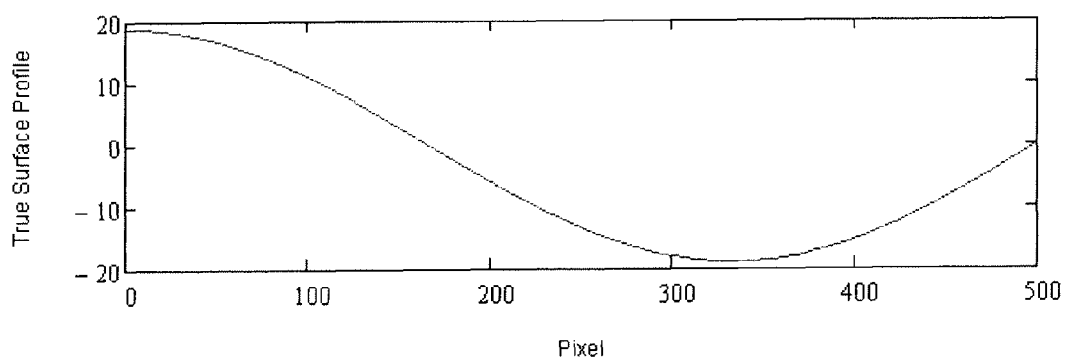
FIG. 2 is plot of test surface profile as part of simulation.

This is exemplified by the simulation shown in FIG. 2, FIGS. 3A-3D, and FIG. 4 in which interferograms $I_p(x)$ and $I_k(x)$ are simulated for the test surface profile shown in FIG. 2 (where the reference surface is assumed to be perfectly flat) for each of several actual phase shift increments, and a phase map is calculated from the interferograms under the assumption that the actual phase shift increment equals an intended phase shift increment of $\pi/2$ radians (or equivalently 90 degrees), in which case the cavity phase is given by:

$$\theta(x) = \tan^{-1}\left[\frac{(I_k(x) - A(x))\cos(\varphi) - (I_p(x) - A(x))}{(I_k(x) - A(x))\sin(\varphi)}\right] \quad (3)$$

Figure 3A:
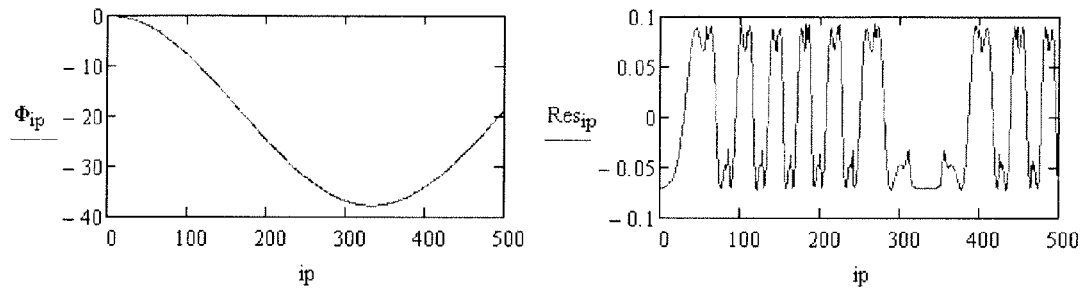
FIGS. 3A-3D are plots of calculated surface profiles (left) and residuals (right) for the test surface in FIG. 2 from a simulated pair of phase-shifted interferograms having an actual phase shift increment of 90, 135, 10, and −10 degrees, respectively, and wherein the calculation assumes an intended phase shift increment of 90 degrees.

As indicated in FIG. 2, the test surface is a sinusoidal shaped line of 500 pixels with a PV departure of 6 fringes. FIG. 3A shows the calculated surface profile (left) and residual (right) if the actual phase increment really is 90 degrees. As expected, the phase map is pretty good. The residual is the difference between the measured and true profiles. The reason the residual is not identically zero is because of errors in the AC and DC terms, which are calculated using Eq. 2.

Figure 3B:
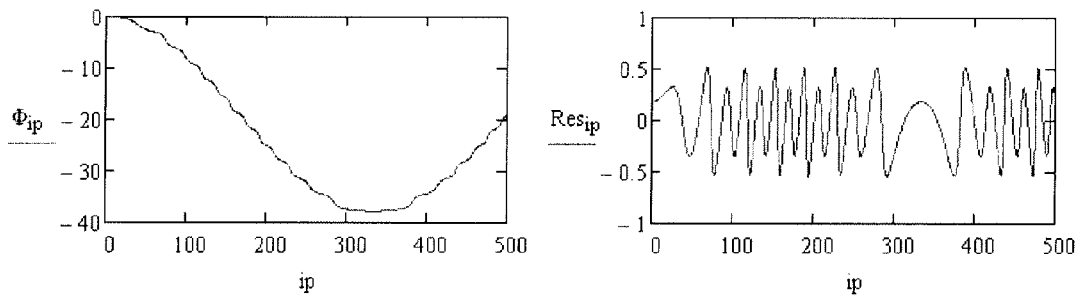
Figure 3C:
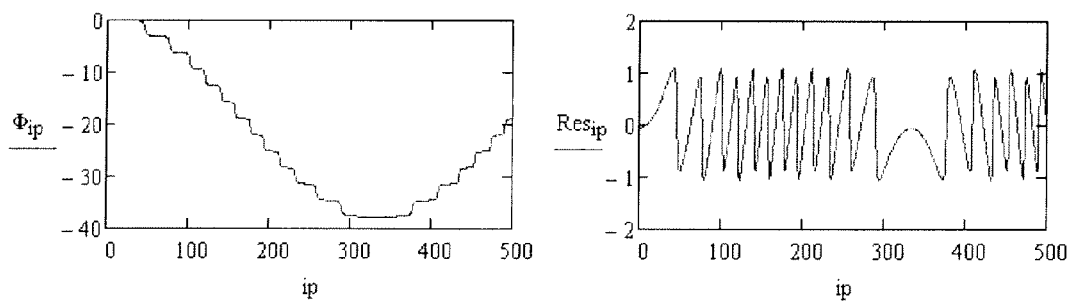

As the phase increment deviates from 90 degrees, the residual gets worse, but the surface sign is preserved and the general shape is correct. For example, FIG. 3B shows the calculated surface profile (left) and residual (right) if the actual phase increment really is 135 degrees, instead of 90 degrees. Even for large departures, the general shape is preserved, provided the sign of the actual phase increment remains positive (i.e., between 0 and 180 degrees). For example, FIG. 3C shows the calculated surface profile (left) and residual (right) if the actual phase increment really is 10 degrees, instead of 90 degrees.

Figure 3D:
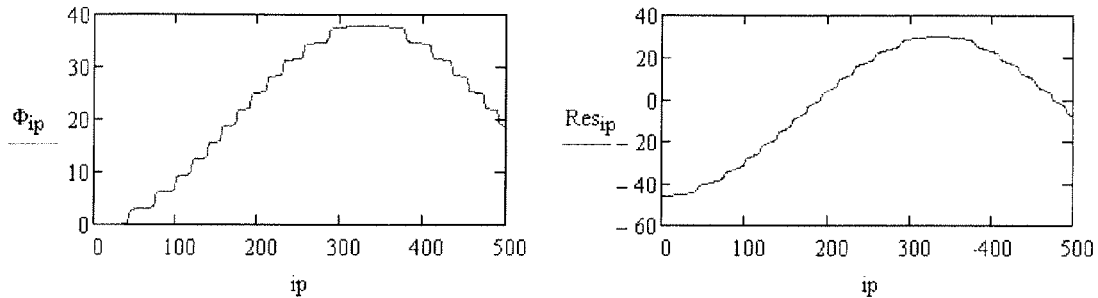

However, if the actual phase shift increment changes sign relative the sign of the intended phase shift increment of 90 degrees (i.e., if the actual phase shift increment crosses the 0 degree (or 180 degree) boundary), the sign for the phase map flips, thereby producing a residual that is catastrophically poor. For example, FIG. 3D shows the calculated surface profile (left) and residual (right) if the actual phase increment really is −10 degrees, instead of 90 degrees. The calculation reports the surface profile peak as a valley, the surface profile valley as a peak.

Figure 4:
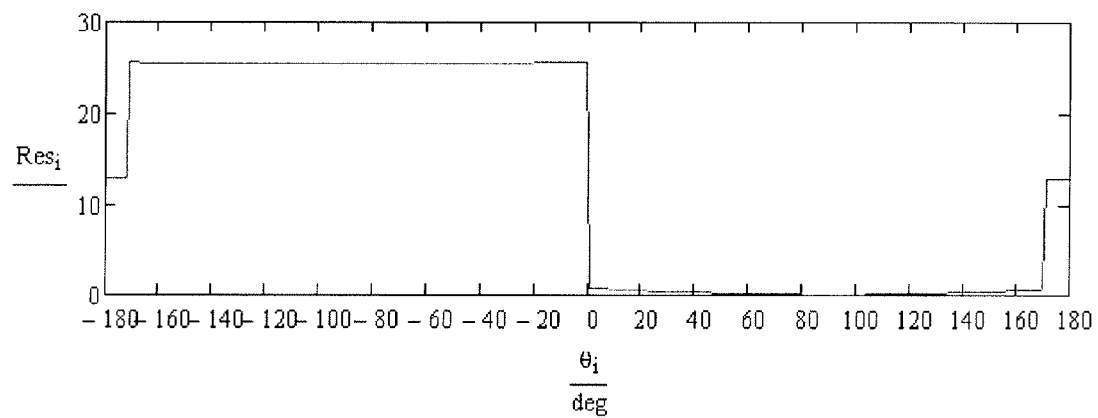
FIG. 4 is a plot of the residual differences as a function of actual phase shift increments from −180 to +180 degrees for the simulation in FIGS. 2 and 3.

The simulation is summarized in FIG. 4, which is a plot of the rms residual as a function of actual phase increment from −180 to +180 degrees for 1 degree increments. As expected the residual gets very large below 0 degrees because of the inversion. While the residuals do rise as you get further away from +90 degrees, the effect is small relative to the effect of inversion. (The reason the simulation does show the abrupt changes near 180 degrees as large as those near 0 degrees is because of the error induced by the AC and DC uncertainties acts differently for those values of the phase increments).

The simulation shows that even for large variations between the actual phase shift increment and the intended phase shift increment, if the sign of the actual phase shift increment is the same as the intended phase shift increment, the calculated phase map generally corresponds to the actual shape of the test surface and therefore can serve as a useful starting point for subsequent iterative fitting techniques to further reduce the residual. However, if the sign changes, the initially determined phase map is catastrophically poor, and can drive subsequently iterative fitting techniques to a wrong solution. Moreover, if an initial phase map is determined by averaging several preliminary phase map calculated from corresponding pairs of interferograms, rather than reducing errors, the averaging can actually increase errors when one or more of the interferogram pairs correspond to actual phase shift increments that change sign relative to the intended phase shift increment.

Processing of PSI Data

Assume an initial phase map estimate $\bar{\theta}(x)$ is provided. Assuming this starting phase map is constant during the acquisition, estimates for the phase shift $\Delta_j$ between all frames $I_j$ relative to this phase map can be calculated in a least squares sense using the measured values for $A(x)$ and $B(x)$. To do this, each frame $I_j$ is fit to the equation;

$$\frac{I_j(x) - A(x)}{B(x)} = \cos(\bar{\theta}(x) + \Delta_j) = C_j \cos(\bar{\theta}(x)) + S_j \sin(\bar{\theta}(x)) \quad (4)$$

where $C_j = \cos(\Delta_j)$ and $S_j = -\sin(\Delta_j)$. Introducing the matrices $$D = \begin{pmatrix} \cos(\bar{\theta}_1) & \sin(\bar{\theta}_1) \\ \vdots & \vdots \\ \cos(\bar{\theta}_i) & \sin(\bar{\theta}_i) \\ \vdots & \vdots \\ \cos(\bar{\theta}_{NP}) & \sin(\bar{\theta}_{NP}) \end{pmatrix}, Y = \begin{pmatrix} \frac{I_{j,1} - A_1}{B_1} \\ \vdots \\ \frac{I_{j,i} - A_i}{B_i} \\ \vdots \\ \frac{I_{j,NP} - A_{NP}}{B_{NP}} \end{pmatrix}, A = \begin{pmatrix} C_j \\ S_j \end{pmatrix} \quad (5)$$

(where i=1 ... NP runs through all the pixels) reduces the task to solving the set of equations $DA=Y$. Multiplying from the left by $D^T$ produces $SA=D^TY$ where $S=D^TD$ is the symmetric scatter matrix, and multiplying from the left by $S^{-1}$ then determines A via $A=S^{-1}D^TY$. Note that this is equivalent to solving, for each frame;

$$\begin{bmatrix} \sum \cos(\bar{\theta}_i)^2 & \sum \cos(\bar{\theta}_i)\sin(\bar{\theta}_i) \\ \sum \cos(\bar{\theta}_i)\sin(\bar{\theta}_i) & \sum \sin(\bar{\theta}_i)^2 \end{bmatrix} \begin{bmatrix} C_j \\ S_j \end{bmatrix} = \begin{bmatrix} \sum \left(\frac{I_{j,i} - A_i}{B_i}\right)\cos(\bar{\theta}_i) \\ \sum \left(\frac{I_{j,i} - A_i}{B_i}\right)\sin(\bar{\theta}_i) \end{bmatrix} \quad (6)$$

for S and C. The sums are over all the pixels in the field and there is one equation for each frame. The phase shifts are then obtained by evaluating $$\Delta_j = \tan^{-1}\left[-\frac{S_j}{C_j}\right]. \quad (7)$$

The phase shift increments $\Delta'$ can then be determined from these phase shifts via $$\Delta_j' = \text{Mod}_{2\pi}(\Delta_j - \Delta_{j-1}) \quad (8)$$

The assumption that the phase map is constant during the acquisition is unnecessarily stringent; often the target surface can undergo rigid body motion during the acquisition. Fortunately Eq. 4 can be extended to solve for higher order cavity motion beyond pure piston. Under most circumstances these higher order terms are very small, but it can be useful in some cases to expand this fit to include small amplitude tip/tilt motion and/or power terms. In those cases Eq. 7 is first used to get an estimate of the piston term, and then Eq. 4 is rewritten in a linearized form to solve for small higher order variations to the estimate. For example, to include small tip and tilt variations, Eq. 4 is rewritten as:

$$\frac{I_j(x) - A(x)}{B(x)} = \cos(\bar{\theta}(x) + \Delta_j + \delta_j + \alpha_j x + \beta_j y) \quad (9)$$
$$= \cos(\bar{\theta}(x) + \Delta_j) - \sin(\bar{\theta}(x) + \Delta_j)(\delta_j + \alpha_j x + \beta_j y)$$

and after determining $\Delta_j$ with Eq. 7, solve for the variations for each frame j via $$\begin{bmatrix} \sum \sin(\theta_j')^2 & \sum \sin(\theta_j')^2 x & \sum \sin(\theta_j')^2 y \\ \sum \sin(\theta_j')^2 x & \sum \sin(\theta_j')^2 x^2 & \sum \sin(\theta_j')^2 xy \\ \sum \sin(\theta_j')^2 y & \sum \sin(\theta_j')^2 xy & \sum \sin(\theta_j')^2 y^2 \end{bmatrix} \begin{bmatrix} \delta_j \\ \alpha_j \\ \beta_j \end{bmatrix} = \quad (10)$$

$$\begin{bmatrix} \sum (\cos(\theta_j') - F_j)\sin(\theta_j') \\ \sum (\cos(\theta_j') - F_j)\sin(\theta_j')x \\ \sum (\cos(\theta_j') - F_j)\sin(\theta_j')y \end{bmatrix}$$

where the sum is over all field positions $$x = \begin{pmatrix} x \\ y \end{pmatrix}, \theta_j'(x) = \bar{\theta}(x) + \Delta_j, F_j(x) = \frac{I_j(x) - A(x)}{B(x)},$$

$\delta$ is the deviation of the phase shift from $\Delta$, and $\alpha_j$ and $\beta_j$ are the x and y tilt coefficients respectively. Alternatively, if the rigid body motion has large amplitude, Eq. 4 can be solved via nonlinear optimization methods.

The phase shift increments between adjacent frames can now be found by simple subtraction. Because these phases are calculated relative to the same initial phase map estimate $\bar{\theta}(x)$, the phase map estimate cancels out from the determined phase increments, making the precision of the determined phase increments mainly independent of the quality of the initial phase map estimate, provided the sign of the initial phase map estimate is correct.

The final interferometric phase map $\Theta(x)$ can then be calculated to improve on the initial phase map estimate $\bar{\theta}(x)$ by using the determined phase shift increments and the corresponding sequence of interferograms. In one embodiment, this final phase map can be found by calculating for each pixel individually the phase of the 1$^{st}$ order interference signal obtained along the phase shift axis (time axis) via a least squares analysis using the measured phase shifts accounting for any measured spatial dependencies. Furthermore, one can solve simultaneously for both the 1$^{st}$ and 2$^{nd}$ harmonics to also account for cavity multiple reflections that could distort the signal. This can be important because orthogonality cannot be counted on to isolate these two harmonics when the sampling is not uniform. It may be desirable to include even higher harmonics at high cavity Finesses. Thus the equation to fit for each pixel i at each interferogram is:

$$I_i = A' + b\cos(\Theta_i + \delta) + c\cos(2\Theta_i + 2\delta) \quad (11)$$
$$= A' + b\cos(\Theta_i)\cos(\delta) - b\sin(\Theta_i)\sin(\delta) +$$
$$c\cos(2\Theta_i)\cos(2\delta) - c\sin(2\Theta_i)\sin(2\delta)$$
$$= A' + B'_i\cos(\delta) + C'_i(\delta) + D'_i\cos(2\delta) + E'_i\sin(2\delta)$$

where δ represents the measured phase shift for the interferogram. Defining the data matrix $$D = \begin{pmatrix} 1 & \cos(\delta_1) & \sin(\delta_1) & \cos(2\delta_1) & \sin(2\delta_1) \\ \vdots & \vdots & \vdots & \vdots & \vdots \\ 1 & \cos(\delta_i) & \sin(\delta_i) & \cos(2\delta_i) & \sin(2\delta_i) \\ \vdots & \vdots & \vdots & \vdots & \vdots \\ 1 & \cos(\delta_M) & \sin(\delta_M) & \cos(2\delta_M) & \sin(2\delta_M) \end{pmatrix} \quad (12)$$

and vectors $$A=[A',B',C',D',E']^T, Y=[I_1, \ldots, I_M]^T, \quad (13)$$

again reduces the task to solving the set of equations DA=Y for A. Note that Y and A are evaluated for each pixel. Following standard Least Squares procedures, the solution is A=[D$^T$D]$^{-1}$D$^T$Y. This is equivalent to solving, for each pixel;

$$\begin{bmatrix} M & \sum\cos(\delta_j) & \sum\sin(\delta_j) & \sum\cos(2\delta_j) & \sum\sin(2\delta_j) \\ \sum\cos(\delta_j) & \sum\cos(\delta_j)^2 & \sum\cos(\delta_j)\sin(\delta_j) & \sum\cos(\delta_j)\cos(2\delta_j) & \sum\cos(\delta_j)\sin(2\delta_j) \\ \sum\sin(\delta_j) & \sum\sin(\delta_j)\cos(\delta_j) & \sum\sin(\delta_j)^2 & \sum\sin(\delta_j)\cos(2\delta_j) & \sum\sin(\delta_j)\sin(2\delta_j) \\ \sum\cos(2\delta_j) & \sum\cos(2\delta_j)\cos(\delta_j) & \sum\cos(2\delta_j)\sin(\delta_j) & \sum\cos(2\delta_j)^2 & \sum\cos(2\delta_j)\sin(2\delta_j) \\ \sum\sin(2\delta_j) & \sum\sin(2\delta_j)\cos(\delta_j) & \sum\sin(2\delta_j)\sin(\delta_j) & \sum\sin(2\delta_j)\cos(2\delta_j) & \sum\sin(2\delta_j)^2 \end{bmatrix} \begin{bmatrix} A' \\ B' \\ C' \\ D' \\ E' \end{bmatrix} = \begin{bmatrix} \sum I_{j,i} \\ \sum I_{j,i}\cos(\delta_j) \\ \sum I_{j,i}\sin(\delta_j) \\ \sum I_{j,i}\cos(2\delta_j) \\ \sum I_{j,i}\sin(2\delta_j) \end{bmatrix} \quad (14)$$

for A' . . . E'. The sums are over all the frames. The final phase map is then obtained by evaluating for each pixel separately $$\Theta(x) = \tan^{-1}\left[-\frac{C'(x)}{B'(x)}\right]. \quad (15)$$

This last fit removes all error associated with uncertainties in the DC term A. The only remaining errors are spatially odd powers of the 1$^{st}$ harmonic. In certain embodiments, such errors can be removed by further processing using the techniques described in commonly owned US Published Patent Application US 2008/0266571 entitled "Vibration Resistant Interferometry" by Leslie L. Deck, the contents of which are incorporated herein by reference.

In yet further embodiments, the processing can continue. For example, at this stage it is possible to use the calculated phase increments and the best phase map to improve the AC and DC term accuracy. This is done by fitting each pixel to Eq. 1 in a least squares sense, i.e. by solving $$\begin{bmatrix} M & \sum\cos(\theta'(x)) \\ \sum\cos(\theta'(x)) & \sum\cos(\theta'(x))^2 \end{bmatrix} \begin{bmatrix} A(x) \\ B(x) \end{bmatrix} = \begin{bmatrix} \sum I(x) \\ \sum I(x)\cos(\theta'(x)) \end{bmatrix} \quad (16)$$

for A(x) and B(x), where the sums are over all M frames and $\theta_j'(x)=\Theta(x)+\Delta_j$. With the recalculated AC and DC terms the phase increments can be improved by another application of Eq. 7 with the new $\theta_j'(x)$ and finally repeating Eq. 15 for a further improved phase map. This sequence of operations can be iterated as desired; however simulations have shown that this iteration procedure essentially converges to the same result that a single application of VC provides.

As indicated by the simulations in FIGS. 2-4, vibrations that cause the actual phase shift increments to change sign relative to the intended phase shift increment can cause an inversion in the calculated phase map. Notably, if such an inverted phase map was used as the initial phase map in the processing of Eqs. 4-7, the determined sequence of phase shift increments would likewise have an incorrect sign. This is evident because both terms are present in the argument of the cosine term in Eq. 4, which is an even function. As resulting, the entire processing sequence of Eqs. 4-7 would yield an "improved" phase map that still has an incorrect sign.

Accordingly, certain embodiments disclosed herein are directed ensuring the sign of the initial phase map used in the PSI data processing described above is correct. Specifically, at least a subset of the PSI data is acquired in a way to substantially reduce the likelihood that vibration will cause the actual phase shift increment to change sign relative to the intended phase shift increment, and it is this subset of the PSI data that is used to establish the correct sign for the initial phase map used in the PSI data processing described above. Alternatively, or in addition, in certain embodiments the calculated sequence of actual phase shift increments can be compared, e.g., correlated, with the sequence of intended phase shift increments to determine the correct sign for the sequence of actual phase shift increments.

Robust Acquisition of PSI Data

One way to reduce the effect of vibration on actual phase shift increments is to improve the rate at which phase-shifted interferograms are acquired. Unfortunately, there are practical limitations to such rapid phase shifting. These include a lower limit for the frame rate period for the camera, a lower limit for the integration time of each interferogram, and a lower limit for the time necessary to impart a desired phase shift increment (typically +90 degrees or −90 degrees). Moreover, rapid phase shifting, such as rapid mechanical scanning of OPD between the test light and the reference light, can produce additional vibrations that further corrupt subsequently acquired PSI data.

What is recognized herein, however, is that PSI data processing techniques are robust, even in the presence of large vibration, provided the initial phase map has the correct sign. Moreover, the initial phase map can be determined with the correct sign based on only a small subset of the PSI data. Accordingly, in certain embodiments, rapid phase shifting is imparted to only a subset of the acquired interferograms, and only to the degree necessary to ensure that the actual phase shift increments have the same sign as the intended phase shift increments. It is this subset that is used to determine the sign of the initial phase map (or even the entire phase map) and then additional interferograms acquired using more gradual phase shifting can be used in the subsequent PSI data processing as described above (either alone, or in conjunction with the more rapidly acquired interferograms).

There are many ways to acquire at least a subset of PSI data to be robust against vibration causing the actual phase shift increment to change sign. For example, if we consider a pair of interferograms corresponding to an intended phase shift increment of 90 degrees (i.e., pi/2 radians), the time period T for imparting the intended phase shift should satisfy:

$$T < \lambda/(4fA) \qquad (17),$$

where $\lambda$ is the wavelength for the test and reference light, f is the vibration frequency, and A is the amplitude of the vibration. According to this equation, the actual phase shift will vary, but the sign will be preserved. Thus, in certain embodiments the subset of the PSI data used to establish the sign of the initial phase map is acquired from a pair of phase-shifted interferograms that satisfy Eq. 17. This equation can be further generalized to account for a distribution of vibrational frequencies and a distribution of vibration amplitudes to guide the PSI data acquisition used to determine the sign of the initial phase map (or equivalently, the sign of the determined sequence of actual phase shift increments).

In certain embodiments, the phase shifting for the pair of interferograms is done continuously and linearly, in which case each such interferogram has an integration time equal to T. In certain embodiments, in order to rapidly read out the intensity values of each interferogram from the camera, the phase-shifting time T straddles adjacent frames in the frame rate of the camera, with an integration time T on each side the frame change, and where the T is typically only a fraction (e.g., one quarter) of the frame rate period for the camera. In this case, the intended phase shift increment between the midpoints of the integration times for the respective interferograms is pi/2 radians. Details of such an approach will now be described.

QuadPair Generation

Figure 5:
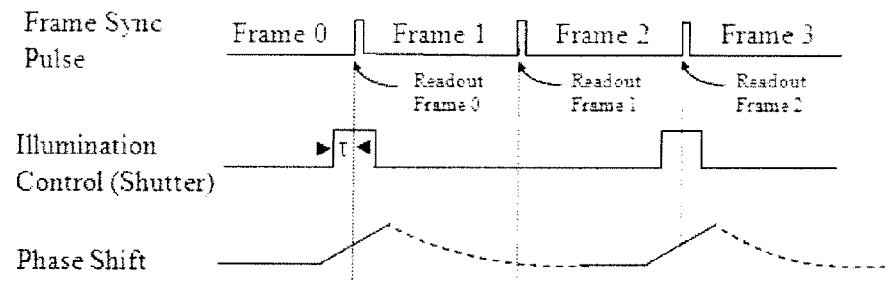
FIG. 5 is a schematic diagram of a PSI data acquisition scheme to reduce the probability that vibration will cause the sign of an actual phase shift increment to be different from the sign of an intended phase shift increment.

A "QuadPair" or QP is a pair of short duration interferograms with a known phase shift (nominally 90 degrees) between them. The QP, along with a measure of the DC term, provides a way to produce a starting phase map in case one is not available by other means. A preferred way of generating QPs is illustrated in FIG. 5. The source illumination is controlled by a shutter to straddle the camera Frame sync while the phase is shifted. The phase shift can be applied in many ways (i.e. mechanical motion or wavelength tuning) and the actual sign of the shift is immaterial, but known. Typically, the intended phase shift magnitude is 90 degrees. Though FIG. 5 shows an acquisition of only QPs, the analysis described herein can be applied to one or more QP's with any number of accompanying single interferograms as long as the total number of interferograms is greater than or equal to three. A shutter may not be necessary if the illumination itself can be modulated, for example by using a laser diode. Accordingly, embodiments may include a modulated camera shutter, a modulated source, or both. Referring to FIG. 5, $\tau$ represents the integration time experienced by a single frame. Frame 0 and 1 constitute one QP, and Frame 2 and 3 another.

The interferometric phase is shifted nominally 90 degrees during the illumination. This can be accomplished a variety of ways. Mechanical phase shifting is one option since the actual velocities required are within the capabilities of standard PZT based phase shifters. For example, vibrations one might encounter on a typical tabletop environment might extend to the KHz range, so the QP's should be acquired in 1 ms or less. For HeNe wavelengths (633 nm) a 90 degree phase shift occurs with an 80 nm physical displacement in a typical interferometer so the mechanical velocity would need to be only 80 microns/sec for 1 ms acquisitions. Velocities of ~1 mm/sec are adequate for all but the most violent vibrations. Mechanical phase shifting has the advantage of no cavity length dependence, but does have the disadvantage of producing cavity motion which, if particularly violent, can stress and deform the reference (or test) surface. Thus, if QPs are acquired by such rapid mechanical phase shifting, in addition to interferograms acquired with more gradual phase shifting, the sequence should be begin with the gradual phase shifting and conclude with the more rapid phase shifting so that vibrations caused by the rapid phase shifting do not affect the integrity of the interferograms acquired during the more gradual phase shifting.

An alternative phase shifting method is wavelength tuning External cavity laser diodes are sources with rapid, wideband wavelength tuning capability and can be used as phase shifters in unequal path interferometers. For example, the New Focus StableWave™ is capable of tuning rates as high as 100 THz/sec. For a cavity with optical path length (one way) of D, the interference frequency f for an optical tuning rate of $\dot{v}$ is $$f = \frac{2\dot{v}D}{c}. \qquad (18)$$

At a tuning rate of 100 THz/sec, a 10 mm cavity would experience an interference frequency of 6.67 KHz—and this would scale linearly with cavity length. Thus, such a laser is more than fast enough to produce cavity phase shift rates that far exceed the rate at which environmental vibrations can influence the phase for all practical cavity lengths. Wavelength tuning has the advantage of phase shifting without physically disturbing the cavity, but does require knowing the cavity length to accurately set the QP phase shift increment.

Another phase shifting method incorporates an electro-optical phase modulator (EOM). Splitting the test and reference wavefronts via polarization enables one or the other to be independently phase modulated with an EOM. The modulation frequency can be extremely rapid, easily satisfying the phase rates needed to freeze the vibration motion. Phase modulation with an EOM has the advantage of phase shifting without physically disturbing the cavity.

The two interferograms forming the QuadPair need not be time adjacent, though that may be convenient depending on the QuadPair production mechanism. Even though the method is robust against deviations of the QP phase increment from 90 degrees, it is important that the sign of the QP phase increment be known; otherwise the resulting surface phase map will be inverted.

Quadpair Analysis for Initial Phase Map and Subsequent Analysis

Consider an acquisition with a number NQ QPs plus N phase shifted single frame interferograms for a total of M=N+2NQ frames. Vibrations mean that the phase shifts between the N frames and NQ QPs may be random, so we cannot a-priori assume any particular phase relationships. However I do require that the frame integration time is short relative to the vibrations present so that contrast loss is negligible. M will likely be large, at least compared to conventional PSI acquisitions, so that we can assure a broad sampling of temporal phases (large temporal phase diversity). Again assuming two-beam interference, the cavity intensity is described by Eq. 1 and the AC and DC terms can be found with Eq. 2 using the full set of M interferograms in the max and min calculations. These estimates will be best for a large number of frames and essentially drive the minimum value for M. For each of the NQ QPs an estimate of the cavity phase map $\theta(x)$ can be made via;

$$\theta(x) = \tan^{-1}\left[\frac{(I_k(x) - A(x))\cos(\varphi) - (I_p(x) - A(x))}{(I_k(x) - A(x))\sin(\varphi)}\right], \quad (19)$$

where $I_k(x)$ and $I_p(x)$ are the two interferograms used in the QP and $\phi$ is the phase shift between them (assumed to be the nominal phase shift of the QP—typically 90 degrees). These individual phase maps are then averaged together to arrive at an averaged phase map estimate $\overline{\theta}(x)$;

$$\overline{\theta}(x) = \sum_{k=0}^{NQ-1} \theta_k / NQ. \quad (20)$$

This average phase map estimate can then be used as the initial phase map estimate in the PSI data processing analysis described above from Equations 4-16.

Phase Bias Analysis

Another way to address the problems caused when vibration causes the actual phase shift increments to be different from the intended phase shift increments, is to use the concept of phase bias. In such embodiments, one need not acquire at least a subset of the PSI data to be more robust against sign change.

For example, consider an acquisition with a number M of phase shifted single frame interferograms as described above (e.g., as in Equation 1). First, the DC and AC terms A(x) and B(x) are determined from the M interferograms as described in Equation 2. Then one selects one or more pairs of interferograms, each such pair in relative quadrature with one another.

This can be accomplished by examining the interferogram intensities relative to the AC and DC ranges. For example, in certain embodiments, one method entails finding, for each pixel separately, the interferogram for which that pixel is nearest DC. That interferogram constitutes one of the two interferograms of an in-quadrature pair, the other interferogram is selected by finding the interferogram for which that pixel's intensity is closest to either DC+AC or DC−AC. This procedure can be performed on each of multiple pixels, thereby producing a large number of in-quadrature pairs, some of which may be redundant. Though there are many ways of reducing the ensemble of pairs to eliminate redundancy, one way which works well is to make sure each interferogram is only used once. With this restriction the maximum number of final candidates cannot exceed M/2. Additionally, restrictions on the deviation of the pixel intensity relative to DC (for the $1^{st}$ pair interferogram) and to DC±AC (for the $2^{nd}$ pair interferogram) can be used to assure that the candidates are close to quadrature. Note that reducing the number of candidates (to a value≧1) can significantly improve algorithm processing speed, and does not affect the algorithm metrology performance since the $1^{st}$ phase map need not be of very high quality.

For each of the NQ interferogram pairs selected, a phase map estimate $\theta(x)$ can be calculated according to:

$$\theta(x) = \tan^{-1}\left[\frac{(I_k(x) - A(x))\cos(\varphi) - (I_p(x) - A(x))}{(I_k(x) - A(x))\sin(\varphi)}\right], \quad (21)$$

where $I_k(x)$ and $I_p(x)$ are the two interferograms used in the in-quadrature pair and $\phi$ is the phase shift between them (assumed to be 90 degrees). At this point the sign of each phase map is uncertain, so one in-quadrature pair is arbitrarily selected, and the sign of every other in-quadrature pair phase map is set to maximize correlation to the first. These individual phase maps are then averaged together to arrive at an averaged phase map estimate $\overline{\theta}(x)$;

$$\overline{\theta}(x) = \sum_{k=0}^{NQ-1} \theta_k(x) / NQ. \quad (22)$$

This average phase map estimate as then used as the initial phase map estimate to calculate the actual phase shift increments according to Equations 4-7.

Now one determines whether the sign for the calculated sequence of phase shifts is correct (or equivalently, whether the selected sign from the in-quadrature pairs is correct). Specifically, the calculated sequence of actual phase shifts is compared with the sequence of intended phase shifts. If the sign is correct, the two sequences should be correlated with another because while large vibrations can cause an actual phase shift increment to be very different (including being opposite in sign) from the intended phase shift, over the sequence of phase shifts, the vibrations will tend to decrease the intended phase shift as often as they tend to increase the intended phase shift. Thus, a correlation between the intended sequence of phase shift increments and each of positive and negative signs for the calculated sequence of actual phase shift increments is calculated, with the higher correlation indicating the correct sign for the calculated series of phase shift increments. This can be expressed by the following equation:

$$\text{Corr}^{\pm} = \sum_{j=0}^{M} \Delta_j'^{\pm} \Psi_j \quad (23)$$

where $\Delta_j'^{\pm}$ is the measured phase-shift increment distribution for the two possible values of the sign, and the sequence of intended phase shift increments is given by $\Psi_j$, where the phases in each sequence are expressed modulo 2 pi from −pi to +pi (or equivalently from −180 degrees to +180 degrees). The phase-shift increment distribution which produced the most positive Corr is then taken as the correct one.

The analysis for determining the improved phase map then proceeds as above (e.g., from Equations 11-15) based on the correct sign for the calculated sequence of phase shifts.

In further embodiments, this phase bias technique can be combined with the QuadPair technique or other techniques for having at least a subset of PSI data robust to vibration-induced sign change to provide a redundant check that the sign is correct.

Moreover, in some embodiments, the initial phase map can be determined as set forth in Equations 21-22 above, except that the sign for the different in-quadrature pairs used in Eq. 22 is not selected arbitrarily, but is instead set by the sign of an initial phase map determined from one or more QuadPairs as set forth in Eq. 19 or 20.

Measurement Modes

Small changes to the analysis described above enable a number of useful alternative measurement modes. For example averaging many measurements is routinely performed to lower the noise floor and improve instrument precision and repeatability. With the analysis of described above, a continuous averaging mode is possible because each new single interferogram acquired while phase shifting can be added to the set of interferograms used to calculate the phase map. The larger this set the smaller the phase error in the final map. Note that the QP acquisition or correlation analysis need only be performed once to evaluate the data sign.

A mode useful for continuously monitoring the cavity phase during environmental disturbances in real-time is called continuous phase. Once a measurement of the phase map is made as described above, each subsequent QP is sufficient to produce another independent measure of the cavity phase by using Eq. 19. So continuously acquiring QPs allows monitoring the cavity phase variation in real time.

A third mode useful for aligning interferometer cavities in real-time is a derivative of the continuous phase mode and is called continuous alignment. The idea is to monitor particular optical parameters such as power or astigmatism continuously during an alignment operation. The cavity is optimally aligned when these parameters are minimized.

Software

The analysis steps described above can be implemented in computer programs using standard programming techniques. Such programs are designed to execute on programmable computers or specifically designed integrated circuits, each comprising an electronic processor, a data storage system (including memory and/or storage elements), at least one input device, and least one output device, such as a display or printer. The program code is applied to input data (e.g., images from the detector) to perform the functions described herein and generate output information (e.g., phase maps, surface profile(s), etc.), which is applied to one or more output devices. Each such computer program can be implemented in a high-level procedural or object-oriented programming language, or an assembly or machine language. Furthermore, the language can be a compiled or interpreted language. Each such computer program can be stored on a computer readable storage medium (e.g., CD ROM or magnetic diskette) that when read by a computer can cause the processor in the computer to perform the analysis and control functions described herein.

Other aspects, features, and advantages are within the scope of the invention.

What is claimed is:

1. A phase-shifting interferometry method for use in the presence of vibrations, the method comprising:

recording an interferogram for each phase in a sequence of phases between test light reflected from a test surface and reference light reflected from a reference surface, the test and reference light being derived from a common source, each interferogram corresponding to an intensity pattern produced by interfering the reflected test light with the reflected reference light, the interferograms defining an interferometry signal for each of different transverse locations of a cavity defined by the test and reference surfaces, each interferometry signal comprising a series of intensity values corresponding to the sequence of phases, with the difference between each pair of phases in the sequence defining a corresponding phase shift increment, each phase shift increment comprising a systematic component and a random component caused by the vibrations, the random component producing a probability that a phase shift increment will change sign relative to the sign for the systematic component, wherein the interferograms are recorded to produce at least two distinct sets of interferograms, the distinct sets comprising a first set comprising at least one pair of interferograms and a second set comprising at least one interferogram, wherein the probability of the sign change in the phase shift increment for the pair of interferograms in the first set is less than that for any pair of interferograms comprising at least one interferogram from the second set;

calculating an initial phase map for the cavity based on at least the pair of interferograms in the first set of interferograms;

calculating an estimate for each of at least some of the phase shift increments based on the initial phase map and at least some of the recorded interferograms; and calculating an improved phase map based on the calculated estimates for the phase shift increments and at least some of the recorded interferograms.

2. The method of claim 1, wherein the recorded interferograms used to calculate the phase shift increments comprise at least one interferogram from the second set.

3. The method of claim 1, wherein calculating the phase shift increment estimates comprises fitting the interferometry signals for the different locations of the cavity to a set of theoretical interferometry signals for a theoretical cavity corresponding to the initial phase map and parameterized by the estimates for the phase shift increments.

4. The method of claim 3, wherein the parameterized estimates for the phase shift increments comprise a set of phase shift increments common to the different locations.

5. The method of claim 1, wherein an electronic detector used to record the interferograms defines a frame rate, and wherein each interferogram in the first set is recorded with an integration time less than an inverse of the frame rate.

6. The method of claim 5, wherein the recorded interferograms in the first set comprise at least one pair of consecutive interferograms obtained during a phase shift increment that straddles adjacent frames of the electronic detector.

7. The method of claim 1, wherein the systematic component of each phase shift increment for consecutive phases defines an absolute magnitude for the phase shift increment, a time period for imparting the magnitude, and a phase slope equal to the absolute magnitude divided by the time period, and wherein the interferograms are recorded to cause the phase slope for each of the phase shift increments corresponding to the interferograms in the first set to be larger than any of the phase slopes corresponding to phase shift increments involving interferograms in the second set.

8. The method of claim 7, wherein the interferograms in the first set are recorded at the end of the sequence of phases.

9. The method of claim 1, wherein the sequence of phases are produced by mechanical phase shifting, wavelength tuning, electro-optic phase modulation, or acousto-optical modulation.

10. The method of claim 1, wherein the systematic components of the phase shift increments of the first set are substantially equal in absolute magnitude to pi/2 radians.

11. The method of claim 1, wherein calculating the initial phase map comprises calculating a preliminary phase map for each of different pairs of interferograms in the first set and averaging the preliminary phase maps.

12. The method of claim 3, wherein the fitting comprises fitting the interferometry signals $I_j$ for the different transverse locations x according to the following expression to determine the phase shift increment estimates:

$$\frac{I_j(x) - A(x)}{B(x)} = \cos(\bar{\theta}(x) + \Delta_j) = C_j \cos(\bar{\theta}(x)) + S_j \sin(\bar{\theta}(x)),$$

wherein $\Delta_j$ defines the sequence of phases, indexed by j, wherein the expression $\cos(\bar{\theta}(x)+\Delta_j)$ corresponds to the theoretical interferometry signals for the initial phase map $\bar{\theta}(x)$, wherein A(x) and B(x) are AC and DC components for the recorded interferometry signals, wherein where $C_j = \cos(\Delta_j)$ and $S_j = -\sin(\Delta_j)$, and wherein the phase shift increment estimates $\Delta'$ are determined from the sequence of phases according to $\Delta_j' = \text{Mod}_{2\pi}(\Delta_j - \Delta_{j-1})$.

13. The method of claim 3, wherein the fitting further accounts for changes in two or more of the piston, tip, and tilt of the test surface during the sequence of phases.

14. The method of claim 1, further comprising storing or outputting information about the improved phase map.

15. The method of claim 1, wherein calculating the initial phase map comprises determining a sign for the initial phase map based on at least some of the interferograms in the first set of interferograms and not any interferograms in the second set.

16. A phase-shifting interferometry method comprising:
 recording an interferogram for each phase in a sequence of phases between test light reflected from a test surface and reference light reflected from a reference surface, the test and reference light being derived from a common source, each interferogram corresponding to an intensity pattern produced by interfering the reflected test light with the reflected reference light, the interferograms defining an interferometry signal for each of different transverse locations of a cavity defined by the test and reference surfaces, each interferometry signal comprising a series of intensity values corresponding to the sequence of phases, with the difference between each pair of phases in the sequence defining a corresponding phase shift increment,
 wherein an electronic detector used to record the interferograms defines a frame rate, and wherein the recorded interferograms comprise a first set comprising at least one pair interferograms each recorded with an integration time less than an inverse of the frame rate;
 calculating an initial phase map for the cavity based on at least the pair of interferograms in the first set of interferograms;
 calculating an estimate for each of at least some of the phase shift increments based on the initial phase map and at least some of the recorded interferograms; and
 calculating an improved phase map based on the calculated estimates for the phase shift increments and at least some of the recorded interferograms.

17. The method of claim 16, wherein the recorded interferograms in the first set comprise at least one pair of consecutive interferograms obtained during a phase shift increment that straddles adjacent frames of the electronic detector.

18. The method of claim 16, wherein calculating the phase shift increment estimates comprises fitting the interferometry signals for the different locations of the cavity to a set of theoretical interferometry signals for a theoretical cavity corresponding to the initial phase map and parameterized by the estimates for the phase shift increments.

19. The method of claim 18, wherein the parameterized estimates for the phase shift increments comprise a set of phase shift increments common to the different locations.

20. The method of claim 16, wherein the first set comprises multiple pairs of consecutive interferograms each recorded with an integration time less than an inverse of the frame rate and obtained during a phase shift increment that straddles adjacent frames of the electronic detector.

21. The method of claim 20, wherein calculating the initial phase map comprises calculating a preliminary phase map for each of different pairs of interferograms in the first set and averaging the preliminary phase maps.

22. The method of claim 16, wherein calculating the initial phase map comprises determining a sign for the initial phase map based on at least some of the interferograms in the first set of interferograms and not any interferograms in a second set different from the first set.

23. The method of claim 22, wherein calculating the initial phase map further comprises identifying one or more pairs of recorded interferograms substantially in-quadrature with one another based on one or more of the recorded interferometry signals and determining an absolute magnitude for the initial phase map based on the identified in-quadrature interferogram pairs.

24. The method of claim 16, wherein the sequence of phases are produced by mechanical phase shifting, wavelength tuning, electro-optic phase modulation, or acousto-optical modulation.

25. A phase-shifting interferometry system for use in the presence of vibrations, the system comprising:
 a phase-shifting interferometry apparatus comprising a light source, a phase-shifting interferometer, and an electronic detector, the apparatus configured to record an interferogram for each phase in a sequence of phases between test light reflected from a test surface and reference light reflected from a reference surface of the phase-shifting interferometer, the test and reference light be derived from a common source corresponding to the light source, each interferogram corresponding to an intensity pattern produced by interfering the reflected test light with the reflected reference light, the interferograms defining an interferometry signal for each of different transverse locations of a cavity defined by the test and reference surfaces, each interferometry signal comprising a series of intensity values corresponding to the sequence of phases, with the difference between each pair of phases in the sequence defining a corresponding phase shift increment, each phase shift increment comprising a systematic component imparted by the phase-shifting interferometer and a random component caused by the vibrations, the random component producing a probability that a phase shift increment will change sign relative to the sign for the systematic component, wherein the phase-shifting apparatus is configured to record the interferograms to produce at least two distinct sets of interferograms, the distinct sets comprising a first set comprising at least one pair of interferograms and a second set comprising at least one interferogram, wherein the probability of the sign change in the phase shift increment for the pair of interferograms in the first set is less than that for any pair of interferograms comprising at least one interferogram from the second set; and an electronic processor coupled to the phase-shifting apparatus, wherein the electronic processor is configured to: (i) calculate an initial phase map for the cavity based on at least the pair of interferograms in the first set of interferograms; (ii) calculate an estimate for each of at least some of the phase shift increments based on the initial phase map and at least some of the recorded interferograms; and (iii) calculate an improved phase map based on the calculated estimates for the phase shift increments and at least some of the recorded interferograms.

26. The phase-shifting interferometry system of claim 25, wherein the calculation of the phase shift increment estimates by the electronic processor comprises fitting the interferometry signals for the different locations of the cavity to a set of theoretical interferometry signals for a theoretical cavity corresponding to the initial phase map and parameterized by the estimates for the phase shift increments.

27. The phase-shifting interferometry system of claim 25, wherein the electronic detector is configured to record the interferograms according to a frame rate, and wherein the phase-shifting interferometry apparatus is configured to record the interferograms in the first set to include at least one pair of consecutive interferograms each recorded with an integration time less than an inverse of the frame rate and obtained during a phase shift increment that straddles adjacent frames of the electronic detector.

28. The phase-shifting interferometry system of claim 25, wherein the systematic component of each phase shift increment for consecutive phases defines an absolute magnitude for the phase shift increment, a time period for imparting the magnitude, and a phase slope equal to the absolute magnitude divided by the time period, and wherein phase-shifting interferometry apparatus is configured to record the interferograms to cause the phase slope for each of the phase shift increments corresponding to the interferograms in the first set to be larger than any of the phase slopes corresponding to phase shift increments involving interferograms in the second set.

29. A phase-shifting interferometry system comprising:
a phase-shifting interferometry apparatus comprising a light source, a phase-shifting interferometer, and an electronic detector, the apparatus configured to record an interferogram for each phase in a sequence of phases between test light reflected from a test surface and reference light reflected from a reference surface of the phase-shifting interferometer, the test and reference light be derived from a common source corresponding to the light source, each interferogram corresponding to an intensity pattern produced by interfering the reflected test light with the reflected reference light, the interferograms defining an interferometry signal for each of different transverse locations of a cavity defined by the test and reference surfaces, each interferometry signal comprising a series of intensity values corresponding to the sequence of phases, with the difference between each pair of phases in the sequence defining a corresponding phase shift increment, wherein the electronic detector is configured to record the interferograms according to a frame rate, and wherein the phase-shifting interferometry apparatus is configured to record the interferograms to include a first set including at least one pair interferograms each recorded with an integration time less than an inverse of the frame rate; and an electronic processor coupled to the phase-shifting apparatus, wherein the electronic processor is configured to: (i) calculate an initial phase map for the cavity based on at least the pair of interferograms in the first set of interferograms; (ii) calculate an estimate for each of at least some of the phase shift increments based on the initial phase map and at least some of the recorded interferograms; and (iii) calculate an improved phase map based on the calculated estimates for the phase shift increments and at least some of the recorded interferograms.

30. The system of claim 29, wherein the phase-shifting apparatus is further configured to cause the recorded interferograms in the first set to include at least one pair of consecutive interferograms obtained during a phase shift increment that straddles adjacent frames of the electronic detector.

* * * * *

UNITED STATES PATENT AND TRADEMARK OFFICE
CERTIFICATE OF CORRECTION

PATENT NO. : 7,796,273 B2  Page 1 of 1
APPLICATION NO. : 12/273831
DATED : September 14, 2010
INVENTOR(S) : Leslie L. Deck It is certified that error appears in the above-identified patent and that said Letters Patent is hereby corrected as shown below:

On the Title page, after the paragraph Prior Publication Data, insert Item (60):
-- Related U.S. Application Data
   (60) Provisional application No. 61/113,759, filed on Nov. 12, 2008 --

Signed and Sealed this

Thirtieth Day of November, 2010

David J. Kappos
*Director of the United States Patent and Trademark Office*